United States Patent
Maeda (10) Patent No.: US 9,419,406 B2
(45) Date of Patent: Aug. 16, 2016

(54) LASER OSCILLATOR PROVIDED WITH BLOWER

(71) Applicant: FANUC CORPORATION, Minamitsuru-gun, Yamanashi (JP)

(72) Inventor: Michinori Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/716,219

(22) Filed: May 19, 2015

(65) Prior Publication Data

US 2015/0340836 A1    Nov. 26, 2015

(30) Foreign Application Priority Data

May 23, 2014   (JP) ................... 2014-107255

(51) Int. Cl.
| | | |
|---|---|---|
| *H01S 3/134* | (2006.01) | |
| *H01S 3/036* | (2006.01) | |
| *H01S 3/223* | (2006.01) | |
| *H01S 3/104* | (2006.01) | |
| *H01S 3/041* | (2006.01) | |

(52) U.S. Cl.
CPC ............... *H01S 3/134* (2013.01); *H01S 3/036* (2013.01); *H01S 3/041* (2013.01); *H01S 3/104* (2013.01); *H01S 3/2232* (2013.01)

(58) Field of Classification Search
CPC .......... H01S 3/134; H01S 3/104; H01S 3/036
See application file for complete search history.

(56) References Cited

FOREIGN PATENT DOCUMENTS

| | | | |
|---|---|---|---|
| JP | H03-218083 A | | 9/1991 |
| JP | H03-246982 A | | 11/1991 |
| JP | H04-22181 A | | 1/1992 |
| JP | 07058420 | * | 3/1995 |
| JP | 2011-211233 | * | 10/2011 |

* cited by examiner

*Primary Examiner* — Dung Nguyen
(74) *Attorney, Agent, or Firm* — RatnerPrestia (57) ABSTRACT

A laser oscillator which can estimate the rotation speed of a blower in an idle state at cheaper cost and higher precision. The laser oscillator is comprised of a resonator part, laser medium flow path, blower, drive part, controller, manometer which measures the pressure of the laser medium at a predetermined position of the laser medium flow path, and rotation speed estimating part which uses the pressure of the laser medium which is measured by the manometer and a predetermined relationship between the pressure of the laser medium and the blower rotation speed at a certain position as the basis to estimate the rotation speed of the blower. The controller controls the drive part so as to restart operation of the blower at the rotation speed which is estimated by the rotation speed estimating part when the power supply to the blower is stopped and the blower is idling.

10 Claims, 7 Drawing Sheets

LASER OSCILLATOR PROVIDED WITH BLOWER

BACKGROUND OF THE INVENTION

1. Field of the Invention

The invention relates to a laser oscillator which is provided with a blower.

2. Description of the Related Art

Known in the art is a laser oscillator which is provided with a blower wherein a rotation speed detection device such as a taco generator or encoder is used to detect the rotation speed of the blower in an idling state and wherein a rotation command value which is transmitted to the blower at the time of restart of operation of the blower is made to match with the detected rotation speed (for example, Japanese Patent Publication No. 3-218083A, Japanese Patent Publication No. 3-246982A, and Japanese Patent Publication No. 4-22181A).

From the viewpoint of reducing the power consumption of a laser oscillator, it is preferable to stop the power supply to a drive part of the blower so as to stop the operation of the blower. In this case, the blower starts idling. In order to quickly restart the operation of the idling blower, it is necessary to detect the rotation speed of the idling blower when restarting its operation.

However, according to the prior art, an encoder or other rotation speed detection device is necessary for detecting the rotation speed of the blower, so this leads to an increase of the manufacturing cost of the laser oscillator. Therefore, a technique, which can estimate the rotation speed of the blower in idling in an inexpensive and accurate manner, is required in the art.

SUMMARY OF THE INVENTION

In one aspect of the invention, the laser oscillator comprises a resonator part which generates laser light; a laser medium flow path for introducing a laser medium into the resonator part and discharging the laser medium from the resonator part; a blower which makes the laser medium to flow through the laser medium flow path; a drive part which drives the blower; a controller which controls the drive part; and a manometer which measures a pressure of the laser medium at a predetermined position of the laser medium flow path.

Further, the laser oscillator comprises a rotation speed estimating part which estimates a rotation speed of the blower, based on a predetermined relationship between the pressure of the laser medium at the predetermined position and the rotation speed of the blower, and on the pressure of the laser medium measured by the manometer. The controller controls the drive part so as to restart the operation of the blower at the rotation speed estimated by the rotation speed estimating part when the power supply to the blower is stopped and the blower is idling.

The laser oscillator may further comprise an uninterruptible power source which can supply power to the controller at the time of power interruption. The laser oscillator may further comprise a storage which stores the predetermined relationship. The predetermined relationship may include a plurality of relationships which respectively correspond to a plurality of operation modes of the laser oscillator.

The laser oscillator may further comprise an operation mode judging part which judges the operation mode by comparing the pressure of the laser medium measured by the manometer when power supply to the blower is stopped with a control target value of the pressure of the laser medium when the power supply to the blower is stopped; and a relationship selecting part which selects the relationship corresponding to the operation mode judged by the operation mode judging part from the plurality of relationships. The rotation speed estimating part may estimate the rotation speed of the blower based on the relationship selected by the relationship selecting part.

The laser oscillator may further comprise an idling detector which detects whether the blower is idling. When the idling detector detects the end of idling of the blower, the controller may control the drive part to restart operation of the blower at the rotation speed estimated by the rotation speed estimating part.

The laser oscillator may further comprise a power interruption detector which detects power interruption and power restoration. The controller may control the drive part to restart operation of the blower at the rotation speed estimated by the rotation speed estimating part when power restoration is detected by the power interruption detector. The laser oscillator may further comprise a closing mechanism which closes the laser medium flow path. The closing mechanism may include a valve mechanism for openably closing another flow path which is in fluid communication with the laser medium flow path. The controller may close the valve mechanism while power supply to the blower is stopped.

The laser oscillator may further comprise a thermometer which measures a temperature of the laser medium; and a first correction part which corrects the pressure of the laser medium measured by the manometer based on the temperature of the laser medium measured by the thermometer. The rotation speed estimating part may estimate the rotation speed of the blower based on the pressure corrected by the first correction part.

The laser oscillator may further comprise a flowmeter which measures a flow rate of the laser medium; and a second correction part which corrects the pressure of the laser medium measured by the manometer based on the flow rate of the laser medium measured by the flowmeter. The rotation speed estimating part may estimate the rotation speed of the blower based on the pressure corrected by the second correction part.

BRIEF DESCRIPTION OF THE DRAWINGS

These and other objects, features, and advantages of the invention will become clearer with reference to the detailed description of illustrative embodiments of the invention which are shown in the attached drawings, wherein.

DESCRIPTION OF THE PREFERRED EMBODIMENTS

Below, embodiments of the invention will be explained in detail based on the drawings. First, referring to FIG. 1, a laser oscillator 10 according to an embodiment of the invention will be explained. The laser oscillator 10 includes a resonator part 12, laser medium flow path 14, and blower 16. The resonator part 12 is filled with a laser medium inside thereof, and includes discharge electrodes (not shown) which are arranged to face each other. If a predetermined AC voltage is applied to the discharge electrodes, the laser medium is excited, whereby laser light is generated. For example, carbon dioxide gas may be used as the laser medium.

Figure 1:
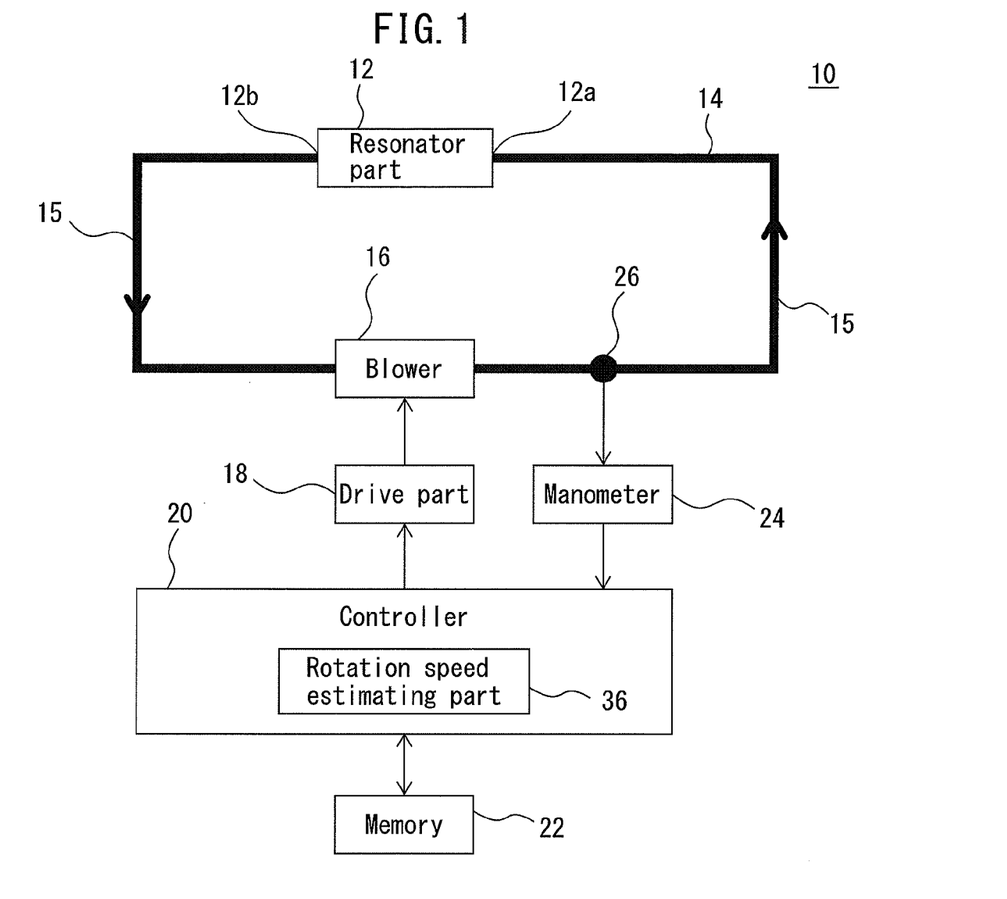
FIG. 1 is a block diagram of a laser oscillator according to an embodiment of the invention.

The laser medium flow path 14 is in fluid communication with the inside of the resonator part 12. Specifically, the laser medium flow path 14 is comprised of a closed-loop fluid pipe which is connected to a laser medium inlet 12$a$ and laser medium outlet 12$b$ of the resonator part 12. The laser medium flow path 14 introduces laser medium into the resonator part 12 through the laser medium inlet 12$a$, while discharging laser medium from the resonator part 12 through the laser medium outlet 12$b$.

The blower 16 is provided in the laser medium flow path 14. Specifically, the blower 16 includes a rotor (not shown) having a plurality of blades and arranged inside of the laser medium flow path 14; and a motor (not shown) for driving the rotor to rotate. The blower 16 rotates the rotor so as to generate pressure fluctuations in the laser medium in the laser medium flow path 14, whereby making the laser medium to flow in the direction indicated by the arrow 15 in FIG. 1.

The laser oscillator 10 further includes a drive part 18, controller 20, storage 22, and manometer 24. The drive part 18 drives the blower 16. Specifically, the drive part 18 is comprised of e.g. a high frequency inverter, and transmits an AC signal to the motor built in the blower 16 so as to rotate the rotor of the blower 16 at a rotation speed corresponding to the frequency of the AC signal.

The controller 20 controls the drive part 18. Specifically, the controller 20 transmits a rotation command to the drive part 18, and the drive part 18 drives the blower 16 in response to the rotation command received from the controller 20. The storage 22 is e.g. a nonvolatile memory comprised of an EEPROM® etc. and can electrically erase and record data.

The controller 20 communicates with the storage 22 to record data in the storage 22 or erase data from the storage 22. The manometer 24 is installed at a predetermined position 26 in the laser medium flow path 14. The manometer 24 measures a pressure of the laser medium at the position 26 in the laser medium flow path 14 in accordance with a command from the controller 20, and transmits data relating to the pressure to the controller 20. The controller 20 stores the pressure data received from the manometer 24 in the storage 22.

Figure 2:
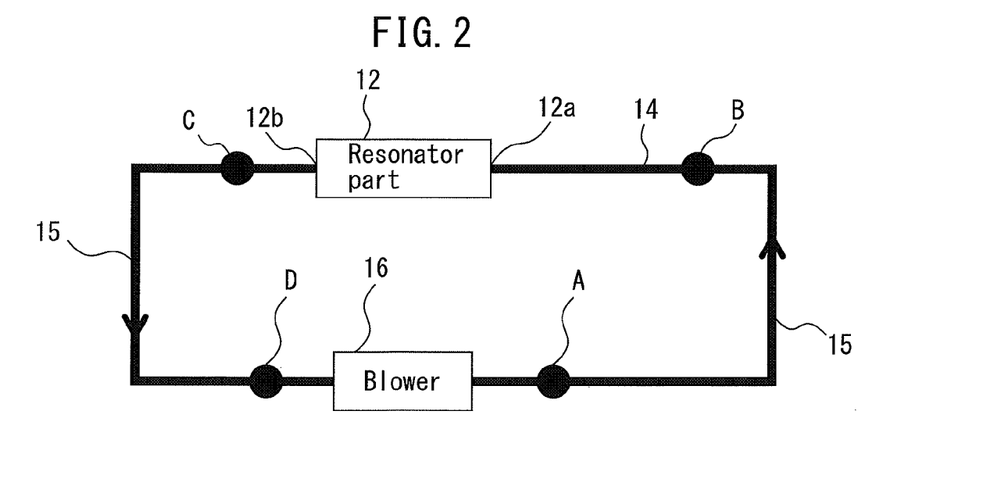
FIG. 2 is a schematic view in which only a resonator part, laser medium flow path, and blower of the laser oscillator shown in FIG. 1 are illustrated.

The laser oscillator 10 according to the present embodiment estimates the rotation speed of the blower 16 by using the pressure of the laser medium obtained by the manometer 24. The principle of this estimation method will be explained below with reference to FIG. 2 to FIG. 4. FIG. 2 shows four different positions A, B, C, and D in the laser medium flow path 14.

The position A is near the discharge port of the blower 16. In the present specification, the position A corresponds to the above position 26. On the other hand, the position D is near the intake port of the blower 16. The position B is positioned at the downstream side of the position A and at the upstream side of the resonator part 12 in the direction of flow of the laser medium. The position C is positioned at the downstream side of the resonator part 12 and at the upstream side of the position D in the direction of flow of the laser medium.

Figure 3:
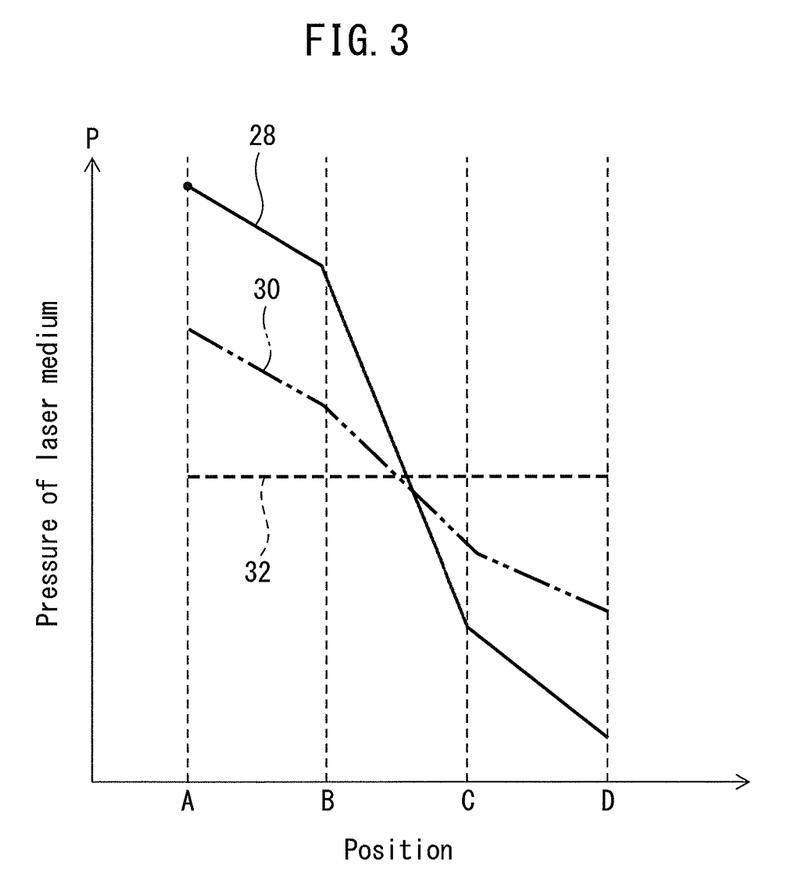
FIG. 3 is a graph representing relationships between the pressure of the laser medium at each of the positions in the laser medium flow path and the positions, regarding three different states of operation of the blower.

FIG. 3 is a graph representing relationships between the pressure P of the laser medium at each of the positions A to D in the laser medium flow path 14 and the positions A to D, regarding three different states of operation of the blower 16. A solid line 28 in FIG. 3 indicates a relationship between the pressure P of the laser medium and the positions A to D in the laser medium flow path 14 when the blower 16 is normally operating at a rotational rotation speed. As shown by the solid line 28, when the blower 16 is normally operating, the pressure of the laser medium at the position A becomes the highest. The pressure P of the laser medium becomes smaller in the order of the position B, position C, and position D.

On the other hand, a dotted line 32 indicates a relationship between the pressure P of the laser medium and the positions A to D when the blower 16 is stopped (i.e., the rotation speed is zero). When the blower 16 is stopped, the pressure P of the laser medium becomes substantially constant over the positions A to D.

A two-dot chain line 30 indicates a relationship between the pressure P of the laser medium and the positions A to D in the middle of decreasing the rotation speed of the blower 16 from the normal operation state shown by the solid line 28 down to the stopped state shown by the dotted line 32, or of increasing the rotation speed of the blower 16 from the stopped state shown by the dotted line 32 up to the normal operating state shown by the solid line 28.

Thus, along with the transition of the blower 16 from the stopped state (the rotation speed of zero) to the normal operating state (a certain rotation speed), the pressure P of the laser medium at the positions A to D changes in the order of the dotted line 32→two-dot chain line 30→solid line 28. That is, there is an interrelationship between the rotation speed of the blower 16 and the pressure P of the laser medium in the laser medium flow path 14.

Figure 4:
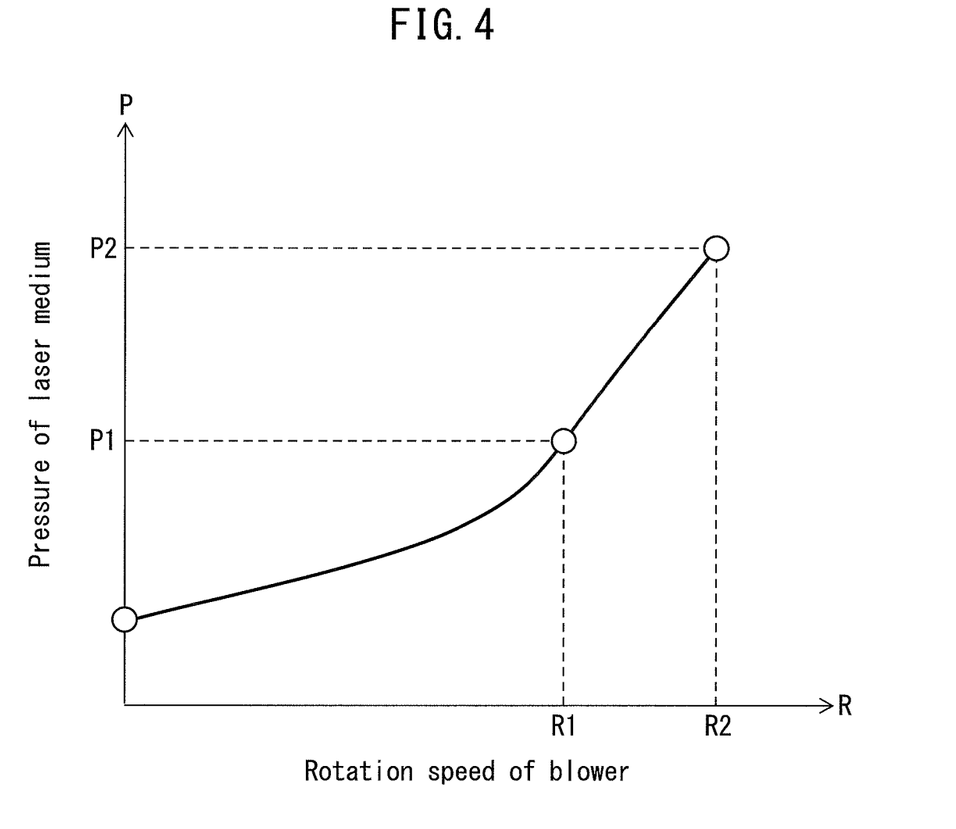
FIG. 4 is a graph representing a relationship between the rotation speed of the blower and the pressure of the laser medium at a predetermined position in the laser medium flow path.

FIG. 4 shows a relationship between the rotation speed R of the blower 16 and the pressure P of the laser medium at the position A (i.e., the position 26). As shown in FIG. 4, when increasing the rotation speed R of the blower 16, the pressure P of the laser medium also increases nonlinearly. Based on this relationship, it is possible to estimate the rotation speed R of the blower 16 from the pressure P of the laser medium.

For example, when the pressure P of the laser medium is P1 (or P2), it is possible to estimate that the blower 16 is being driven at the rotation speed R1 (or R2). The laser oscillator 10 according to the present embodiment pre-stores the relationship between the rotation speed R and pressure P shown in FIG. 4 in the storage 22, and estimates the rotation speed R of the blower 16 based on this relationship and the pressure P of the position 26 measured by the manometer 24. This function will be explained later.

Next, referring to FIG. 1 and FIG. 4, the function of the laser oscillator 10 will be explained. From the viewpoint of reducing the power consumption of the laser oscillator 10, the controller 20 stops the power supply to the blower 16 so as to stop the operation of the blower 16, in response to the state of operation of the laser oscillator 10.

For example, the controller 20 stops the power supply to the blower 16, when receiving a shutdown command of the blower 16 from the user, or in accordance with an operation program pre-stored in the storage 22. As one example, the controller 20 stops the power supply to the blower 16 in conjunction with the stopping of generation of laser light at the resonator part 12. When the power supply to the blower 16 is stopped, the rotor of the blower 16 starts idling. During the power supply to the blower 16 is stopped, the rotation speed of the blower 16 gradually decreases along with the elapse of time.

After stopping the power supply to the blower 16, in response to the state of operation of the laser oscillator 10, the controller 20 restarts the power supply to the blower 16 via the drive part 18 in order to restart the operation of the blower 16. Here, if the blower 16 is idling at the time of restart of operation of the blower 16, it is necessary that the controller 20 restarts the operation of the blower 16 at a rotation speed which matches the rotation speed of the blower 16 which is idling, in order to quickly control the rotation of the blower 16.

For this, the controller 20 firstly acquires the pressure of the laser medium at the position 26 at the time of restart of operation of the blower 16 from the manometer 24. Next, the controller 20 reads out data relating to the relationship between the rotation speed R of the blower 16 and the pressure P of the laser medium at the position 26 shown in FIG. 4 from the storage 22.

Next, the controller 20 applies the pressure obtained from the manometer 24 to the relationship shown in FIG. 4, and estimates the rotation speed Re of the blower 16 at the time of restart of operation. Thus, in the present embodiment, the controller 20 functions as a rotation speed estimating part 36 (FIG. 1) which estimates the rotation speed Re of the blower 16, based on the pressure of the laser medium measured by the manometer 24, and on the relationship stored in the storage 22.

After estimating the rotation speed Re of the blower 16, the controller 20 transmits a rotation command in accordance with the estimated rotation speed Re to the drive part 18, and controls the blower 16 via the drive part 18 so that the blower 16 restarts the operation at the rotation speed Re. Here, the mode of the restarted operation of the blower 16 includes increasing the rotational rotation speed of the blower 16 and decreasing the rotational rotation speed of the blower 16.

For example, when increasing the rotation speed of the blower 16, the controller 20 firstly drives the blower 16 to rotate at the rotation speed Re, then sequentially increases the rotation speed of the blower 16 from the rotation speed Re. On the other hand, when decreasing the rotation speed of the blower 16, the controller 20 firstly drives the blower 16 to rotate at the rotation speed Re, then sequentially decreases the rotation speed of the blower 16 from the rotation speed Re.

As explained above, in the present embodiment, the rotation speed of the blower 16 which is idling at the time of restart of operation is estimated by using the pressure measured by the manometer 24. Here, in a common laser oscillator, a manometer for monitoring and controlling the pressure of the laser medium in the laser oscillator is installed, in order to control the generation of laser light.

According to the present embodiment, it is possible to estimate the rotation speed of the blower 16 which is idling by utilizing the manometer which is usually installed at the laser oscillator, without any additional equipment such as an encoder etc. The controller 20 can restart the operation of the blower 16 in synchronization with the rotation speed at the time of idling. According to this configuration, it is possible to restart the operation (i.e., acceleration or deceleration) of the idling blower 16 in a quick and safe manner, while reducing the manufacturing cost of the laser oscillator 10.

Further, according to the present embodiment, since the operation of the blower 16 can be quickly restarted, it becomes possible to frequently stop the power supplied to the blower 16 in response to the state of operation of the laser oscillator 10. Therefore, the power consumption of the laser oscillator 10 can be reduced.

Next, referring to FIG. 5, the laser oscillator 40 according to another embodiment of the invention will be explained. Note that, elements similar to the above embodiment are assigned the same reference numerals and detailed explanations thereof will be omitted. The laser oscillator 40 includes a resonator part 12, laser medium flow path 14, blower 16, drive part 18, storage 22, manometer 24, controller 42, and idling detector 44.

The controller 42 controls the drive part 18. The idling detector 44 detects whether the blower 16 is idling. For example, the idling detector 44 includes a voltmeter, ammeter, and/or wattmeter, and detect whether the blower 16 is idling by detecting the voltage, current, and/or power supplied to the blower 16.

In one example, the idling detector 44 may judge that the blower 16 is idling when the voltage applied to the blower 16 has become zero, and transmit an idling signal, which indicates that the blower 16 is idling, to the controller 42.

On the other hand, when the idling detector 44 detects that the voltage applied to the blower 16 has risen from zero to a predetermined voltage, it transmits an idling end signal which indicates that the idling of the blower 16 has ended. The controller 42 can determine whether or not the blower 16 is idling by the idling signal and idling end signal from the idling detector 44.

In another example, the idling detector 44 may judge that the blower 16 is idling when a predetermined time (for example, 1 second) has elapsed from the point of time when the voltage applied to the blower 16 becomes zero, and transmit an idling signal, which indicates that the blower 16 is idling, to the controller 42. On the other hand, the idling detector 44 transmits an idling end signal which indicates that the idling of the blower 16 has ended, when a predetermined time (for example, 1 second) has elapsed from the point of time when the voltage supplied to the blower 16 has risen from zero to a predetermined voltage.

Next, referring to FIG. 5 and FIG. 6, the function of the laser oscillator 40 will be explained. Similar as the above embodiment, the controller 42 stops the power supply to the blower 16 to stop the blower 16 in response to the state of operation of the laser oscillator 40, from the viewpoint of decreasing the power consumption of the laser oscillator 40. At this time, the idling detector 44 detects idling of the blower 16.

In the present embodiment, the controller 42 more accurately estimates the rotation speed of the blower 16 which is idling by judging the operation mode of the laser oscillator 40 at the time of stopping the blower 16 and selecting a relationship between the rotation speed S and pressure P which corresponds to the judged operation mode. This function will be explained below.

Figure 6:
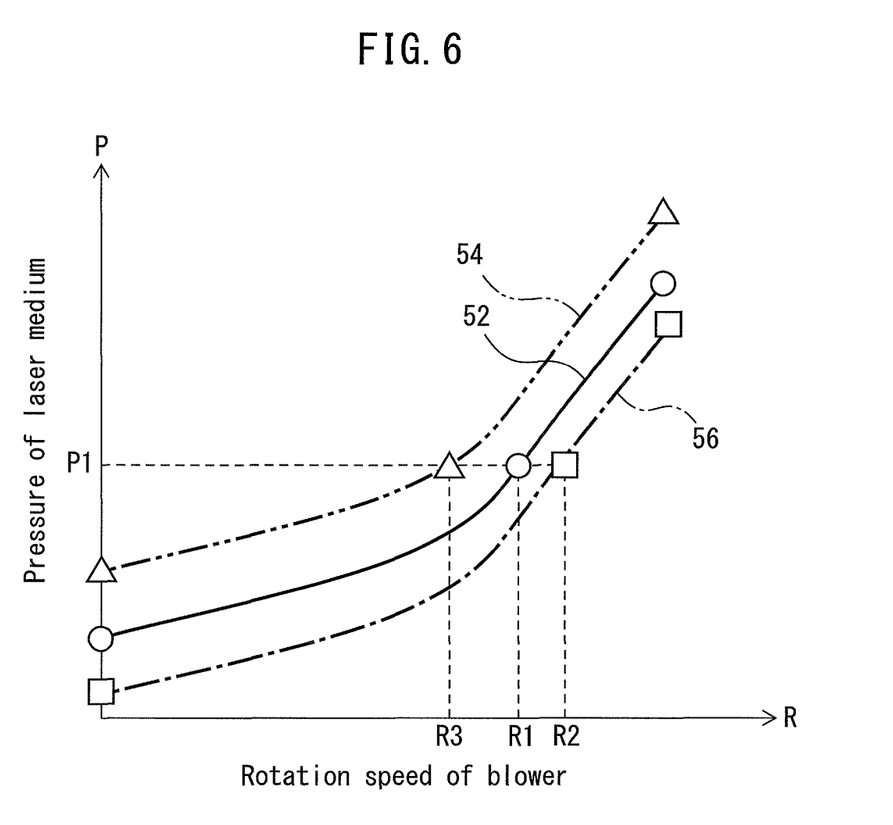
FIG. 6 is a graph which shows three different relationships corresponding to three different operation modes of the laser oscillator and which corresponds to FIG. 4.

FIG. 6 shows relationships between the pressure P of the laser medium at the position 26 and the rotation speed R of the blower 16, each of which corresponds to each of three different operation modes of the laser oscillator 40. The solid line 52 shows a relationship of the case where the laser oscillator 40 operates in a normal mode. In this normal mode, the laser oscillator 40 generates laser light having a first power at the resonator part 12. For example, in the case where the laser oscillator 40 is applied to a laser processing machine, the laser oscillator 40 operates in the normal mode when processing a workpiece by a laser having an usual laser power.

The two-dot chain line 54 shows a relationship in the case where the laser oscillator 40 operates in a high-power mode. In this high-power mode, the laser oscillator 40 generates laser light having a second power larger than the first power at the resonator part 12. For example, in the case where the laser oscillator 40 is applied to the laser processing machine, the laser oscillator 40 operates in the high-power mode when processing a workpiece by a laser having a higher laser power than usual.

The one-dot chain line 56 shows a relationship in the case where the laser oscillator 40 is in the standby mode. In this standby mode, the laser oscillator 40 stops the generation of laser light at the resonator part 12. For example, in the case where the laser oscillator 40 is applied to a laser processing machine, the laser oscillator 40 is set to the standby mode when the laser processing machine is halting to processing the workpiece due to e.g. changing for the workpiece.

As shown in FIG. 6, the relationship between the pressure P of the laser medium and the rotation speed R of the blower 16 differs depending on the operation mode of the laser oscillator 40. Therefore, in order to precisely estimate the rotation speed R of the blower 16 from the pressure P of the laser medium, it is necessary to judge the current operation mode of the laser oscillator 40.

For this, in the present embodiment, the controller 42 judges the operation mode of the laser oscillator 40 based on the pressure of the laser medium measured by the manometer 24. Specifically, the controller 42 acquires the pressure of the laser medium from the manometer 24 when the idling detector 44 detects idling of the blower 16, and compares the acquired pressure value with control target values of pressure which are set with respect to each operation mode. The control target values of pressure are pre-stored in the storage 22.

For example, when operating the laser oscillator 40 by the normal mode, the control target value of the pressure of the laser medium at the position 26 is set to a first control target value α. Further, when operating the laser oscillator 40 by the high-power mode, the control target value of the pressure of the laser medium at the position 26 is set to a second control target value β. Further, when operating the laser oscillator 40 by the standby mode, the control target value of the pressure of the laser medium at the position 26 is set to a third control target value γ.

The controller 42 determines which of the first to third control target values the pressure of the laser medium measured by the manometer 24 corresponds to, and judges the operation mode of the laser oscillator 40. For example, the controller 42 judges that the laser oscillator 40 has operated in the normal mode when the measured pressure of the laser medium is in the range of ±10% of the first control target value α. Thus, in the present embodiment, the controller 42 functions as an operation mode judging part 48 (FIG. 5) which judges the operation mode of the laser oscillator 40 based on the pressure of the laser medium.

Next, the controller 42 selects the relationship which corresponds to the judged operation mode. For example, when the operation mode of the laser oscillator 40 is judged to be the normal mode, the controller 42 selects the relationship of the solid line 52 from the three relationships of the solid line 52, the two-dot chain line 54, and the one-dot chain line 56 in FIG. 6 which are pre-stored in the storage 22, and reads out the corresponding data from the storage 22. Thus, in the present embodiment, the controller 42 functions as a relationship selecting part 50 (FIG. 5) which selects the relationship (e.g. the relationship of solid line 52) corresponding to the operation mode of the laser oscillator 40 from the plurality of relationships.

Next, the controller 42 restarts the power supply to the blower 16 so as to restart the operation of the blower 16 in response to the state of operation of the laser oscillator 40. At this time, the idling detector 44 detects the end of idling of the blower 16. Then, the controller 42 acquires the pressure of the laser medium at this point of time from the manometer 24.

Then, the controller 42 applies the acquired pressure to the relationship which is shown by the solid line 52 in FIG. 6 and which has been selected as explained above. Whereby, the controller 42 estimates the rotation speed Re of the blower 16 at the time of restart of operation. Thus, in the present embodiment, the controller 42 functions as a rotation speed estimating part 46 (FIG. 5) which estimates the rotation speed Re of the blower 16 based on the pressure of the laser medium and the selected relationship (e.g. the relationship of solid line 52). Then, the controller 42 sends a rotation command in accordance with the estimated rotation speed Re to the drive part 18, and controls the blower 16 to rotate at the rotation speed Re.

In this way, according to the present embodiment, the operation mode of the laser oscillator 40 is judged based on the pressure of the laser medium measured by the manometer 24, and the rotation speed of the blower 16 is estimated based on the relationship between the rotation speed R and pressure P which corresponds to the operation mode. Due to this, it is possible to more accurately estimate the rotation speed of the blower 16. As a result, it is possible to restart the operation of the blower 16 which is idling in a safe and quick manner.

Next, referring to FIG. 7, a laser oscillator 60 according to still another embodiment of the invention will be explained. Note that, elements similar to the above-mentioned embodiments will be assigned the same reference numerals and detailed explanations thereof will be omitted. The laser oscillator 60 includes a resonator part 12, laser medium flow path 14, blower 16, drive part 18, storage 22, manometer 24, controller 62, power interruption detector 64, and uninterruptible power source 66.

The power interruption detector 64 can detect a power interruption and power restoration of the main power supplied to the whole laser oscillator 60. Note that, the power interruption detector 64 may detect a power interruption/power restoration which occurs at a part of the laser oscillator 60 (for example, a part including the drive part 18 and/or blower 16). The uninterruptible power source 66 is an emergency power supply which can supply power to at least the controller 62 when a power interruption occurs.

When a power interruption occurs, the power supply to the blower 16 is stopped, as a result of which, the blower 16 starts idling. After that, in order to control the idling blower 16 safely and quickly when the power of the laser oscillator 60 is restored, it is necessary to restart the operation of the blower 16 at the rotation speed of the blower 16 at the time of power restoration.

Next, the function of the laser oscillator 60 according to the present embodiment will be explained. When the power interruption detector 64 detects the power interruption, the controller 62 acquires the pressure of the laser medium which has been measured by the manometer 24 just recently (e.g., right before or right after power interruption). Further, the controller 62 functions as the above-mentioned operation mode judging part 48 so as to judge the operation mode of the laser oscillator 60 based on the acquired pressure. Next, the controller 62 functions as the above-mentioned relationship selecting part 50 so as to select the relationship between the rotation speed R and pressure P which corresponds to the judged operation mode.

When the power interruption detector 64 detects a power restoration after the power interruption, the controller 62 acquires the pressure of the laser medium which has been measured by the manometer 24 just recently. Then, the controller 62 functions as the above-mentioned rotation speed estimating part 46 so as to estimate the rotation speed Re of the blower 16 at the time of power restoration based on the selected relationship.

Then, the controller 62 transmits a rotation command in accordance with the estimated rotation speed Re to the drive part 18, and controls the blower 16 to restart the operation at the rotation speed Re. In this way, according to the present embodiment, when the power is suddenly shut down during operation of the laser oscillator 60 and is subsequently restored, it is possible to safely and quickly control the blower 16 which is idling at the time of power restoration. Further, according to the present embodiment, since the uninterruptible power source 66 is provided, it is possible to quickly restart the laser oscillator 60 without waiting for the startup time of the controller 62 after power restoration.

Note that, in the above-mentioned laser oscillators 40 and 60, there are three operation modes consisting of the normal mode, high-power mode, and standby mode. However, there may be a plurality of operation modes other than the above three operation modes.

For example, as a still other operation mode, a transition mode may also be set which correspond to a state during transition from the standby mode to the normal mode (or from the normal mode to the standby mode) or a state during transition from the normal mode to the high-power mode (or from the high-power mode to the normal mode).

When the laser oscillator 40, 60 is in such transition mode, the relationship between the pressure P of the laser medium and the rotation speed R of the blower 16 differs from the three relationships shown in FIG. 6. Therefore, in order to accurately estimate the rotation speed R of the blower 16 from the pressure P of the laser medium, it is necessary to pre-store the relationship between the pressure P and rotation speed R which corresponds to the transition mode in the storage 22.

In one example, as a transition mode between the standby mode and the normal mode, a first transition mode and a second transition mode are set. For example, the first transition mode is a transition mode where the condition of the laser medium is close to the standby mode, while the second transition mode is a transition mode where the condition of the laser medium is closer to the normal mode than the first transition mode. In this case, the storage 22 stores the respective relationships between the pressure P and rotation speed R corresponding to the first transition mode and second transition mode.

The relationship between the pressure P and the rotation speed R corresponding to the first transition mode can be expressed as a graph which is positioned in the region between the solid line 52 and the one-dot chain line 56 in FIG. 6 so as to be closer to the one-dot chain line 56. On the other hand, the relationship between the pressure P and rotation speed R corresponding to the second transition mode can be expressed as a graph which is positioned in the region between the solid line 52 and the one-dot chain line 56 in FIG. 6 so as to be closer to the solid line 52 than the graph of the first transition mode.

Similarly, as a transition mode between the normal mode and the high-power mode, a third transition mode and fourth transition mode may be set. For example, the third transition mode is a transition mode where the condition of the laser medium is close to the normal mode, while the fourth transition mode is a transition mode where the condition of the laser medium is closer to the high-power mode than the third transition mode. In this case, the storage 22 pre-stores the respective relationships between the pressure P and the rotation speed R corresponding to the third transition mode and the fourth transition mode.

The relationship between the pressure P and the rotation speed R corresponding to the third transition mode can be expressed as a graph which is positioned in the region between the solid line 52 and the two-dot chain line 54 in FIG. 6 so as to be closer to the solid line 52. On the other hand, the relationship between the pressure P and rotation speed R corresponding to the fourth transition mode can be expressed as a graph which is positioned in the region between the solid line 52 and the two-dot chain line 54 in FIG. 6 so as to be closer to the two-dot chain line 54 than the graph of the third transition mode.

Below, the operation in the case where the first to fourth transition modes are set in the laser oscillator 60 will be explained. When the power interruption detector 64 detects power interruption, the controller 62 acquires the pressure of the laser medium measured by the manometer 24 just recently. Next, the controller 62 functions as the operation mode judging part 48 so as to compare the acquired pressure value with the pressure control target value which has been set at the time of a power interruption.

Here, if a power interruption occurs during the transition mode, the control target value of pressure which has been set at this time is a control target value used for the destination operation mode. Specifically, if a power interruption occurs during transitioning from the normal mode to the high-power mode, the control target value for the high-power mode (i.e., the second control target value $\beta$) is set at this time. Similarly, if a power interruption occurs during transitioning from the normal mode to the standby mode, the control target value for the standby mode (i.e., the third control target value $\gamma$) is set at this time.

Accordingly, if a power interruption occurs during transitioning from the normal mode to the high-power mode, the controller 62 compares the acquired pressure value with the second control target value $\beta$. At this time, the acquired pressure value has not reached the second control target value B (or $\pm 10\%$ of $\beta$), whereby the controller 62 can judge that the operation mode is the transition mode between the normal mode and the high-power mode.

Next, the controller 62 calculates the difference $\delta_P$ between the acquired pressure value and the second control target value $\beta$. Then, based on the difference $\delta_P$, the controller 62 judges which of the third transition mode and fourth transition mode the current operation mode corresponds to.

For example, the controller 62 judges that the third transition mode is appropriate when the difference $\delta_P$ is in a predetermined first range ($x1 \leq \delta_P \leq x2$), while judges that the fourth transition mode is appropriate when the difference $\delta_P$ is in a second range ($x3 \leq \delta_P \leq x4$ and $x4 < x1$).

Next, the controller 62 functions as a relationship selecting part 50 so as to select the relationship which corresponds to the judged operation mode. For example, when judging the third transition mode is appropriate, the controller 62 selects the relationship which corresponds to the third transition mode from the plurality of relationships pre-stored in the storage 22, and reads out the data from the storage 22.

When the power interruption detector 64 detects power restoration, the controller 62 acquires the pressure of the laser medium measured by the manometer 24 just recently. Then, the controller 62 functions as a rotation speed estimating part 46 so as to estimate the rotation speed Re of the blower 16 at the time of power restoration based on the relationship corresponding to the third transition mode.

Thus, by setting a plurality of transition modes in addition to the normal mode, high-power mode, and standby mode, it is possible to restart the operation of the blower 16 safely and quickly at the time of power restoration, even if a power interruption etc. occurs during the transition mode of the laser oscillators 40 and 60.

Figure 8:
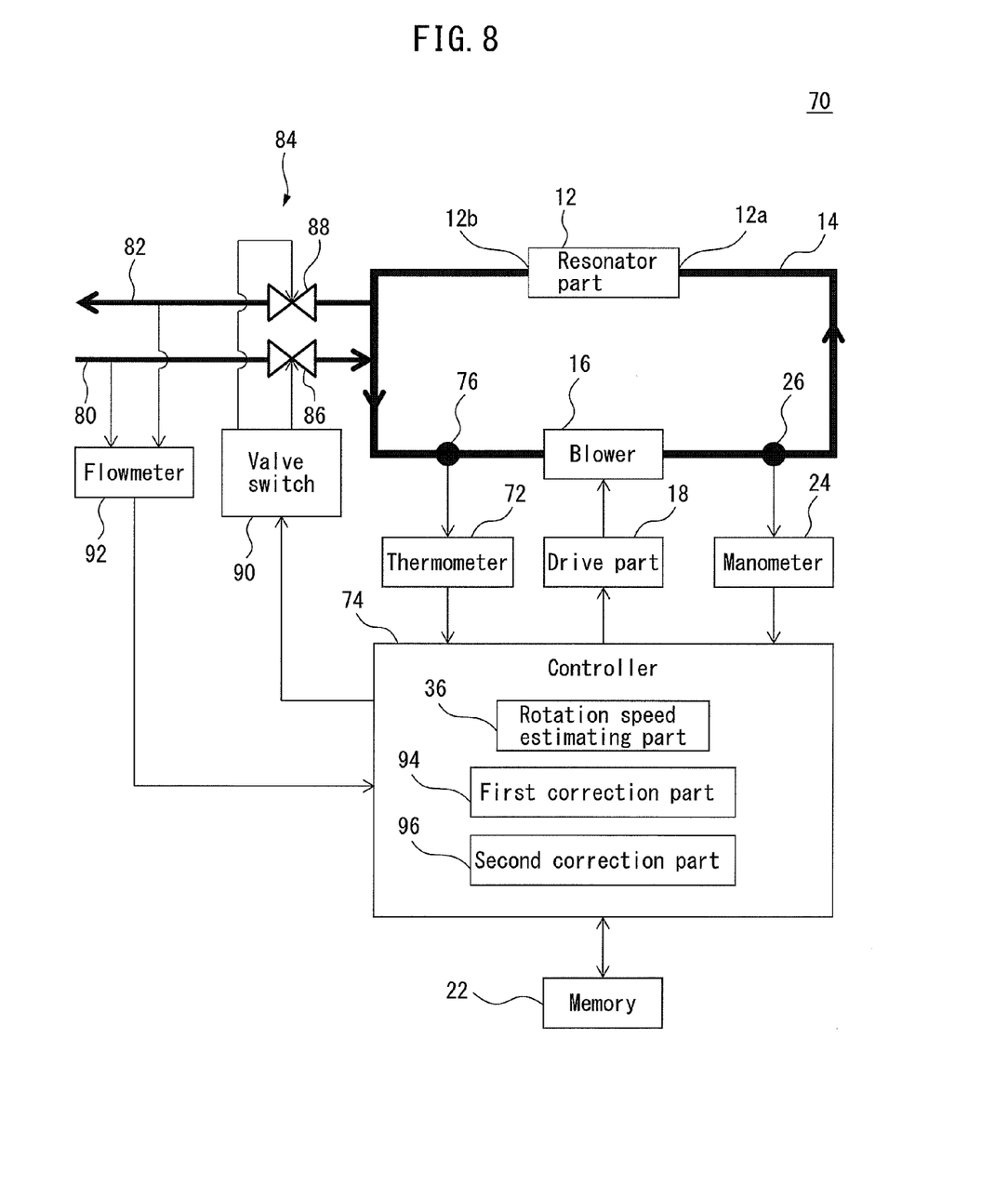
FIG. 8 is a block diagram of a laser oscillator according to still another embodiment of the invention.

Next, referring to FIG. 8, a laser oscillator 70 according to still another embodiment of the invention will be explained. Note that, elements similar to the above-mentioned embodiments will be assigned the same reference numerals and detailed explanations thereof will be omitted. The laser oscillator 70 includes a resonator part 12, laser medium flow path 14, blower 16, drive part 18, storage 22, manometer 24, thermometer 72, and controller 74.

The thermometer 72 is installed at a predetermined position 76 in the laser medium flow path 14. The thermometer 72 measures the temperature of the laser medium in the laser medium flow path 14, and transmits data relating to the temperature to the controller 74. The controller 74 stores the received data relating to the temperature in the storage 22. The controller 74 has the function of the above-mentioned rotation speed estimating part 36, and controls the drive part 18.

In the present embodiment, the flow path 80 for supply of the laser medium and the flow path 82 for discharge of the laser medium are provided to be in fluid communication with the laser medium flow path 14. The flow path 80 for supply of the laser medium is connected to a laser medium supply source installed at the outside of the laser oscillator 70. The laser medium is supplied from the laser medium supply source to the laser medium flow path 14 through the flow path 80. On the other hand, the laser medium inside the laser medium flow path 14 is discharged to the outside of the laser medium flow path 14 through the flow path 82 for discharge of the laser medium.

The laser oscillator 70 further includes a closing mechanism 84 for closing the laser medium flow path 14 to be cut-off from the outside. In the present embodiment, the closing mechanism 84 is comprised of a valve mechanism, and includes a valve 86 capable of opening and closing the flow path 80; a valve 88 capable of opening and closing the flow path 82; and a valve switch 90 which drives the valves 86 and 88. The valve switch 90 opens and closes the valves 86 and 88 in accordance with a command from the controller 74.

The laser oscillator 70 further includes a flowmeter 92 which measures the flow rate of the laser medium in each of the flow path 80 and the flow path 82. The flowmeter 92 sends data relating the measured flow rate to the controller 74. The controller 74 stores the received data relating to the flow rate in the storage 22.

Next, the function of the laser oscillator 70 according to the present embodiment will be explained. Similar as the above-mentioned embodiments, the controller 74 stops the power supply to the blower 16 so as to stop the blower 16 in response to the state of operation of the laser oscillator 70, from the viewpoint of decreasing the power consumption of the laser oscillator 70. At this time, the controller 74 sends a command to the valve switch 90 so as to close the valves 86 and 88, thereby the laser medium flow path 14 is closed.

Next, when restarting the operation of the blower 16, the controller 74 acquires the pressure measured by the manometer 24 just recently, and reads out the relationship between the rotation speed R and pressure P shown in FIG. 4 from the storage 22. Then, the controller 74 functions as a rotation speed estimating part 36 so as to estimate the rotation speed of the blower 16 based on the pressure and the relationship.

Here, in the present embodiment, in order to more accurately estimate the rotation speed of the blower 16, the controller 74 correct the value of the pressure measured by the manometer 24, based on the temperature of the laser medium measured by the thermometer 72, and on the flow rate of the laser medium measured by the flowmeter 92. This function will be explained below.

The relationship between the rotation speed R and the pressure P shown in FIG. 4 changes in response to the temperature of the laser medium in the laser medium flow path 14. Therefore, in order to precisely estimate the rotation speed of the blower 16, it is necessary to correct the value of the pressure measured by the manometer 24 in response to the temperature of the laser medium in the laser medium flow path 14, and estimate the rotation speed of the blower 16 on the basis of the corrected pressure value. For example, the storage 22 pre-stores a data table representing the correspondence between the temperature of the laser medium and the pressure correction value at this temperature.

The controller 74 corrects the value of the pressure which is measured by the manometer 24 by using the data table and the temperature of the laser medium measured by the thermometer 72. Then, the controller 74 applies the corrected pressure value to the above relationship so as to estimate the rotation speed of the blower 16. Thus, in the present embodiment, the controller 74 functions as a first correction part 94 which corrects the measured pressure of the laser medium based on the temperature of the laser medium.

In addition, the relationship between the rotation speed R and the pressure P shown in FIG. 4 changes in response to the flow rate of the laser medium which is supplied to or discharged from the laser medium flow path 14. Therefore, in order to more precisely estimate the rotation speed of the blower 16, it is necessary to correct the value of the pressure measured by the manometer 24 in response to the flow rate of the laser medium supplied to/discharged from the laser medium flow path 14, and estimate the rotation speed of the blower 16 on the basis of the corrected pressure value.

For example, the storage 22 pre-stores a data table representing the correspondence between the flow rate of the laser medium supplied to/discharged from the laser medium flow path 14 and the pressure correction value at this flow rate. The controller 74 correct the value of the pressure measured by the manometer 24 based on the data table and the flow rate measured by the flowmeter 92. Then, the controller 74 applies the corrected pressure value to the above relationship so as to estimate the rotation speed of the blower 16. Thus, in the present embodiment, the controller 74 functions as a second correction part 96 which corrects the measured pressure of the laser medium based on the flow rate of the laser medium.

As stated above, according to the present embodiment, it is possible to more precisely estimate the rotation speed of the blower 16 which is idling by correcting the pressure of the laser medium based on the temperature and flow rate of the laser medium.

Further, according to the present embodiment, the controller 74 closes the laser medium flow path 15 by the closing mechanism 84 when the operation of the blower 16 is stopped. Due to this, it is possible to decrease fluctuations in the pressure of the laser medium inside of the laser medium flow path 14. As a result, it is possible to accurately measure the pressure of the laser medium by the manometer 24, whereby it is possible to more accurately estimate the rotation speed of the idling blower.

Note that, in the above-mentioned embodiment, the case of setting the manometer 24 at the position 26 (that is, corresponding to the position A) and using the relationship between the rotation speed R and the pressure P at the position 26 (relationship of FIG. 4) as the basis to estimate the rotation speed of the blower 16 was explained. However, the invention is not limited to this. The manometer 24, for example, may be installed at any position of the laser medium flow path 14 including the positions B, C, and D shown in FIG. 2. In this case, the storage 22 stores relationships between the rotation speed R and pressure P at the position where the manometer 24 is installed.

Further, in the above-mentioned embodiments, the case where the flowmeter 92 is set at the flow path 80 for supply of the laser medium and the flow path 82 for discharge of the laser medium was explained. However, the invention is not limited to this. The flowmeter 92 may be set at any position in the laser medium flow path.

Figure 5:
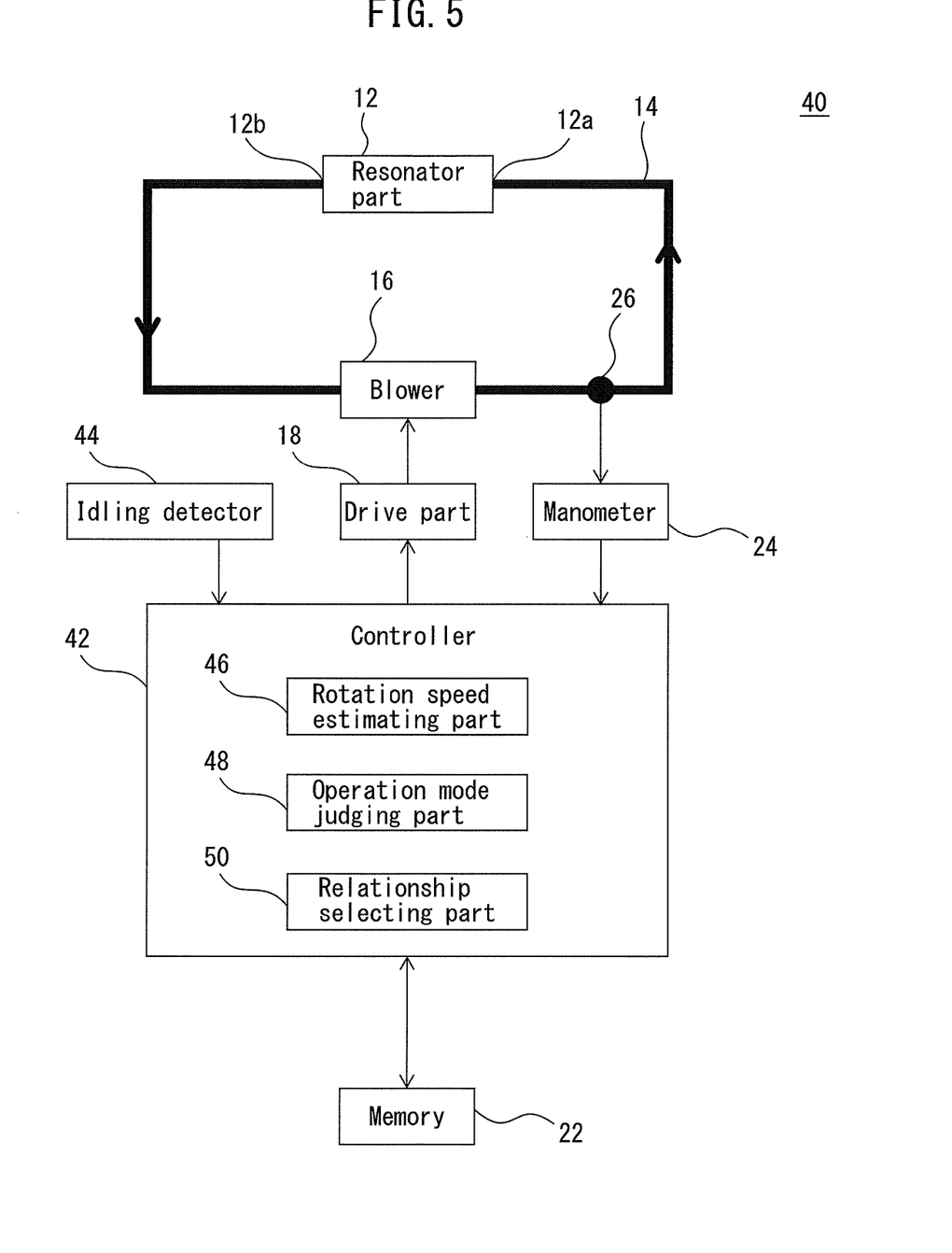
FIG. 5 is a block diagram of a laser oscillator according to another embodiment of the invention.
Figure 7:
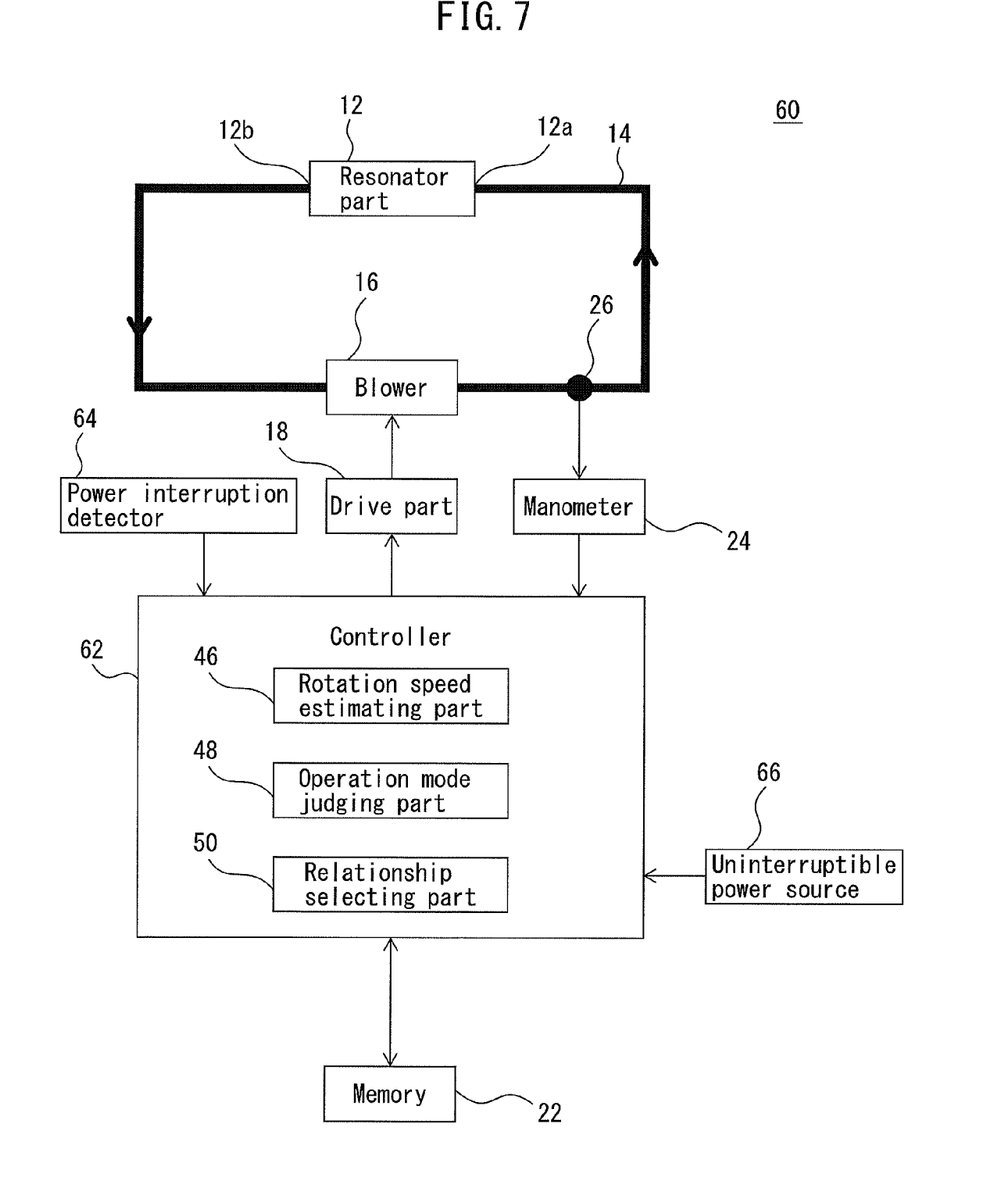
FIG. 7 is a block diagram of a laser oscillator according to still another embodiment of the invention.

Further, the power interruption detector 64 shown in FIG. 7 can be applied to the laser oscillator 40 shown in FIG. 5. In this case, the idling detector 44 monitors the voltage of the blower 16, while the power interruption detector 64 monitors the main power of the laser oscillator 60. Then, the controller 42 judges idling of the blower 16 based on the signal transmitted from the idling detector 44 and power interruption detector 64, and then restarts the operation of the blower 16 which is idling.

Further, for convenience in explanation, the laser oscillators 10, 40, 60, and 70 were explained such that they respectively include different components from each other (i.e., idling detector 44, operation mode judging part 48, relationship selecting part 50, power interruption detector 64, thermometer 72, closing mechanism 84, flowmeter 92, first correction part 94, and second correction part 96). However, the laser oscillator may be provided with all of these components or may be provided with any combination of these components.

Above, embodiments of the invention were used to explain the invention, but the above embodiments do not limit the inventions according to the claims. Further, combinations of the features which are explained in the embodiments of the invention may also be included in the technical scope of the invention. However, not all of the combinations of these features are necessarily essential for the solution of the invention. Further, the fact that the above embodiments can be changed or improved in various ways would be clear to a person skilled in the art.

Further, in the claims, description, and drawings, it should be noted that the operations, routines, steps, processes, stages, and other processing may be performed in any order so long as "before", "in advance", etc. are not especially clearly indicated and, further, the output of prior processing is not used in later processing. In the claims, description, and drawings, even if for convenience "first", "next", "then" etc. are used for explanation for the operational flow, this does not mean that performance in that order is essential.

The invention claimed is:

1. A laser oscillator comprising: a resonator part which generates laser light; a laser medium flow path for introducing a laser medium into the resonator part and discharging the laser medium from the resonator part; a blower which makes the laser medium to flow through the laser medium flow path; a drive part which drives the blower; a controller which controls the drive part; a manometer which measures a pressure of the laser medium at a predetermined position of the laser medium flow path; and a rotation speed estimating part which estimates a rotation speed of the blower, based on a predetermined relationship between the pressure of the laser medium at the predetermined position and the rotation speed of the blower, and on the pressure of the laser medium measured by the manometer, wherein the controller controls the drive part so as to restart the operation of the blower at the rotation speed estimated by the rotation speed estimating part when a power supply to the blower is stopped and the blower is idling.

2. The laser oscillator according to claim 1 further comprising an uninterruptible power source capable of supplying power to the controller at the time of power interruption.

3. The laser oscillator according to claim 1 further comprising a storage which stores the predetermined relationship.

4. The laser oscillator according to claim 1, wherein the predetermined relationship includes a plurality of relationships which respectively correspond to a plurality of operation modes of the laser oscillator, wherein the laser oscillator further comprises: an operation mode judging part which judges the operation mode by comparing the pressure of the laser medium measured by the manometer when the power supply to the blower is stopped with a control target value of the pressure of the laser medium when the power supply to the blower is stopped; and a relationship selecting part which selects the relationship corresponding to the operation mode judged by the operation mode judging part from the plurality of relationships, wherein the rotation speed estimating part estimates the rotation speed of the blower based on the relationship selected by the relationship selecting part.

5. The laser oscillator according to claim 1 further comprising an idling detector which detects whether the blower is idling, wherein, the controller controls the drive part so as to restart the operation of the blower at the rotation speed estimated by the rotation speed estimating part, when the idling detector detects the end of idling of the blower.

6. The laser oscillator according to claim 1 further comprising a power interruption detector which detects power interruption and power restoration, wherein the controller controls the drive part so as to restart the operation of the blower at the rotation speed estimated by the rotation speed estimating part, when power restoration is detected by the power interruption detector.

7. The laser oscillator according to claim 1 further comprising a closing mechanism which closes the laser medium flow path.

8. The laser oscillator according to claim 7, wherein the closing mechanism includes a valve mechanism for openably closing another flow path which is in fluid communication with the laser medium flow path, the controller closes the valve mechanism during the power supply to the blower is stopped.

9. The laser oscillator according to claim 1 further comprising: a thermometer which measures a temperature of the laser medium; and a first correction part which corrects the pressure of the laser medium measured by the manometer based on the temperature of the laser medium measured by the thermometer, wherein the rotation speed estimating part estimates the rotation speed of the blower based on the pressure corrected by the first correction part.

10. The laser oscillator according to claim 1 further comprising: a flowmeter which measures a flow rate of the laser medium; and a second correction part which corrects the pressure of the laser medium measured by the manometer based on the flow rate of the laser medium measured by the flowmeter, wherein the rotation speed estimating part estimates the rotation speed of the blower based on the pressure corrected by the second correction part.

* * * * *